(12) United States Patent
Tateno et al.

(10) Patent No.: US 12,191,743 B2
(45) Date of Patent: Jan. 7, 2025

(54) VEHICLE DRIVE DEVICE, MOTOR CASING FOR VEHICLE DRIVE DEVICE, AND MANUFACTURING METHOD OF THE SAME

(71) Applicant: TOYOTA JIDOSHA KABUSHIKI KAISHA, Toyota (JP)

(72) Inventors: Hiroyuki Tateno, Nagoya (JP); Hidetomo Shiota, Seto (JP); Naoya Yamamoto, Toyota (JP); Masahiro Tanae, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 347 days.

(21) Appl. No.: 17/655,659

(22) Filed: Mar. 21, 2022

(65) Prior Publication Data

US 2022/0320947 A1 Oct. 6, 2022

(30) Foreign Application Priority Data

Mar. 30, 2021 (JP) ................. 2021-057087

(51) Int. Cl.
| | |
|---|---|
| H02K 5/20 | (2006.01) |
| B22C 9/22 | (2006.01) |
| B22C 11/00 | (2006.01) |
| B60K 1/00 | (2006.01) |
| H02K 9/19 | (2006.01) |
| H02K 15/14 | (2006.01) |

(52) U.S. Cl.
CPC ............ H02K 5/203 (2021.01); B22C 9/22 (2013.01); B22C 11/00 (2013.01); B60K 1/00 (2013.01); H02K 9/19 (2013.01); H02K 15/14 (2013.01); *B60K 2001/006* (2013.01)

(58) Field of Classification Search
CPC . H02K 5/00; H02K 9/19; H02K 15/14; B60K 1/00; B60K 2001/006
See application file for complete search history.

(56) References Cited

U.S. PATENT DOCUMENTS

| | | | | |
|---|---|---|---|---|
| 10,197,131 | B2* | 2/2019 | Mukohara | F01M 1/02 |
| 10,742,091 | B2* | 8/2020 | Honjo | H02K 9/193 |
| 11,873,897 | B2* | 1/2024 | Nakamatsu | F16H 63/3483 |
| 2014/0174385 | A1* | 6/2014 | Kisaichi | F01M 1/02 |
| | | | | 123/41.44 |
| 2020/0070640 | A1* | 3/2020 | Murai | B60H 1/3223 |
| 2020/0161993 | A1* | 5/2020 | Kishimoto | H05K 7/20 |
| 2022/0158523 | A1* | 5/2022 | Ishikawa | F16H 57/0476 |

FOREIGN PATENT DOCUMENTS

JP 62-13711 A 1/1987

* cited by examiner

*Primary Examiner* — Brian L Swenson
(74) *Attorney, Agent, or Firm* — Oblon, McClelland, Maier & Neustadt, L.L.P.

(57) ABSTRACT

A motor casing of cast metal used for a vehicle drive device, comprising an equipment mounting seat provided on a top part, an oil cooler connection seat, and a longitudinal hole opened in the oil cooler connection seat, wherein a seat surface of the equipment mounting seat is inclined to get higher from one side to the other, and the longitudinal hole is inclined to get higher from one side to the other in parallel to the seat surface.

4 Claims, 7 Drawing Sheets

A-A SECTIONAL VIEW

VEHICLE DRIVE DEVICE, MOTOR CASING FOR VEHICLE DRIVE DEVICE, AND MANUFACTURING METHOD OF THE SAME

CROSS REFERENCE TO RELATED APPLICATION

This application claims priority to Japanese Patent Application No. 2021-057087 filed on Mar. 30, 2021, which is incorporated herein by reference in its entirety including the specification, claims, drawings, and abstract.

TECHNICAL FIELD

The present disclosure relates to a structure of a vehicle drive device to which a vehicle control device is attached, a structure of a motor casing which is used for the vehicle drive device, and a manufacturing method thereof.

BACKGROUND

There have been proposed methods for forming an oil passage in die cast products. For example, there is proposed a method for forming an oil passage by forming cast holes which are extended in two mutually orthogonal directions by using core pins at the time of casting and drilling a hole after casting to establish communication between the two cast holes (JP62-013711A).

SUMMARY

Equipment such as a vehicle control device is occasionally mounted on a motor casing for a vehicle drive device produced by die casting or the like. The vehicle drive device is mounted in a front compartment provided at the front of the vehicle. In consideration of collision safety, the front compartment has its upper side covered with a hood which is inclined at a certain angle such that the hood increases its height from the front toward the rear of the vehicle. Therefore, to mount the vehicle drive device in the front compartment, the upper surface of the equipment attached to the motor casing for the vehicle drive device must be inclined to get higher from the vehicle front toward the vehicle rear along the inclination of the hood. Therefore, it is necessary to form an equipment mounting seat having an inclined seat surface on the top of the motor casing for the vehicle drive device.

It is also necessary to attach an oil cooler directly to the motor casing for the vehicle drive device. In this case, it is necessary to form an oil passage which is in communication with the oil cooler attached on the motor casing.

Therefore, the present disclosure provides a motor casing structure in which an equipment mounting seat having an inclined upper seat surface and an oil passage can be formed by casting.

The motor casing described in the specification is a motor casing of cast metal which is used for a vehicle drive device mounted on a vehicle, comprising an equipment mounting seat provided on the top of the motor casing, an oil cooler connection seat, and a cast hole opened in the oil cooler connection seat, wherein the equipment mounting seat has an inclined seat surface so to get higher from one side toward the other, and the cast hole is inclined from the one side toward the other in parallel to the seat surface.

Thus, the motor casing structure that can form the equipment mounting seat having the inclined seat surface on the top part and the oil passage is provided by casting.

The motor casing of the present disclosure can be provided with a machined hole which is extended from the interior in a direction to intersect with the cast hole so to communicate with it and has a depth shallower than that of the cast hole.

Thus, when an L-shaped oil passage is configured, a longer hole is formed by casting and a shorter hole is formed by machining, so that the oil passage can be formed by little machining, and a degree of flexibility of the oil passage shape can be improved.

In the motor casing of the present disclosure, the oil cooler connection seat is provided on the front, the one side is the vehicle front and the other side is the vehicle rear, the vehicle drive device is mounted in a front compartment which is covered with a hood inclined so to get higher from the vehicle front toward the vehicle rear, and when the vehicle drive device is mounted in the front compartment, the seat surface of the equipment mounting seat is inclined to get higher from the vehicle front toward the vehicle rear along the inclination of the hood.

Accordingly, the vehicle drive device can be mounted in the front compartment with high space efficiency.

The vehicle drive device described in the specification is a vehicle drive device mounted in a front compartment which is covered with a hood inclined to get higher from the vehicle front toward the vehicle rear, comprising a motor casing including an equipment mounting seat provided on a top part, an oil cooler connection seat provided on a front part, a cast hole opened in the oil cooler connection seat, and a machined hole which is in communication with the cast hole from the interior and shallower than the depth of the cast hole; a vehicle control device attached to the top of the seat surface of the equipment mounting seat; an oil cooler attached to the oil cooler connection seat; and a cooling pipe connected to the machined hole, wherein the seat surface of the equipment mounting seat of the motor casing is inclined to get higher from the front toward the rear, and the cast hole is inclined to get higher from the front toward the rear in parallel to the seat surface, and when the vehicle drive device is mounted in the front compartment, the upper surface of the vehicle control device is inclined to get higher from the vehicle front toward the vehicle rear along the inclination of the hood.

Accordingly, the vehicle drive device can be mounted in the front compartment with high space efficiency, and the structure can be simplified by attaching the oil cooler directly to the motor casing for the vehicle drive device.

The manufacturing method for a motor casing described in the specification is a manufacturing method for a motor casing used for a vehicle drive device including an equipment mounting seat, an oil cooler connection seat, a cast hole opened in the oil cooler connection seat, and a machined hole communicating with the cast hole from the interior, wherein the manufacturing method comprises a mold assembling step for assembling a mold by combining a first mold for casting a first part including the equipment mounting seat, a second mold for casting a second part opposed to the first part, a third mold for casting a third part including the oil cooler connection seat and the cast hole, a fourth mold for casting a fourth part opposed to the third part, a fifth mold for casting a fifth part, and a sixth mold for casting a sixth part; a charging step for charging molten metal into the mold; a demolding step for taking out cast metal including the equipment mounting seat, the oil cooler connection seat, and the cast hole by demolding the first mold and the second mold in a vertical direction relative to the seat surface of the equipment mounting seat, demolding the third mold and the fourth mold in a direction parallel to the seat surface of the equipment mounting seat, and demolding the fifth mold and the sixth mold in a direction orthogonal to the demolding directions of the third mold and the fourth mold; and a hole machining step for forming the machined hole which is extended from the interior of the cast metal in a direction to intersect with the cast hole to communicate with the cast hole and has a depth shallower than that of the cast hole.

Thus, the hole communicating with the oil cooler can be formed when the demolding direction of the first mold is set parallel to the seat surface of the equipment mounting seat. In addition, when the L-shaped oil passage is formed, a longer hole is formed by casting, and a shorter hole is formed by machining, so that the oil passage can be formed by little machining, and the flexibility of the oil passage shape can be improved.

In the manufacturing method for the motor casing described in the specification, the equipment mounting seat is provided on the top of the motor casing, the oil cooler connection seat is provided on the front of the motor casing, the first part is a top part including the equipment mounting seat, the first mold is an upper mold, the second part is a lower part opposed to the top part, the second mold is a lower mold, the third part is a front part including the oil cooler connection seat and the cast hole, the third mold is a front mold, the fourth part is a rear part opposed to the front part, the fourth mold is a rear mold, the fifth part is a left part, the fifth mold is a left mold, the sixth part is a right part, the sixth mold is a right mold, and the left mold and the right mold are demolded in the right and left direction.

In the manufacturing method for a motor casing described in the specification, the upper mold is provided with sprues, and the charging step can charge the molten metal into the mold through the sprues.

Thus, the sprues are formed in the upper mold and the molten metal is charged from the side of the equipment mounting seat having the inclined seat surface, so that casting quality of the equipment mounting seat can be secured.

The present disclosed disclosure can provide a motor casing structure in which the equipment mounting seat having the inclined upper seat surface and the oil passage can be formed by casting.

DESCRIPTION OF EMBODIMENTS

Hereinafter, a vehicle drive device 20 of an embodiment and a motor casing 21 used for the vehicle drive device 20 will be described with reference to the drawings. In the drawings, arrow FR indicates the frontward direction of a vehicle 10, arrow LH indicates the leftward direction of the vehicle 10, and arrow UP indicates the upward direction of the vehicle 10. In the following description, unless otherwise specified, terms indicating directions and orientations such as front-rear, right-left and up-down directions indicate directions and orientations in relation to the vehicle 10. In the drawings showing the vehicle drive device 20 and the motor casing 21, the arrows FR, LH, and UP indicate the frontward direction, the leftward direction, and the upward direction of the vehicle when the vehicle drive device 20 and the motor casing 21 are mounted on the vehicle 10.

Figure 1:
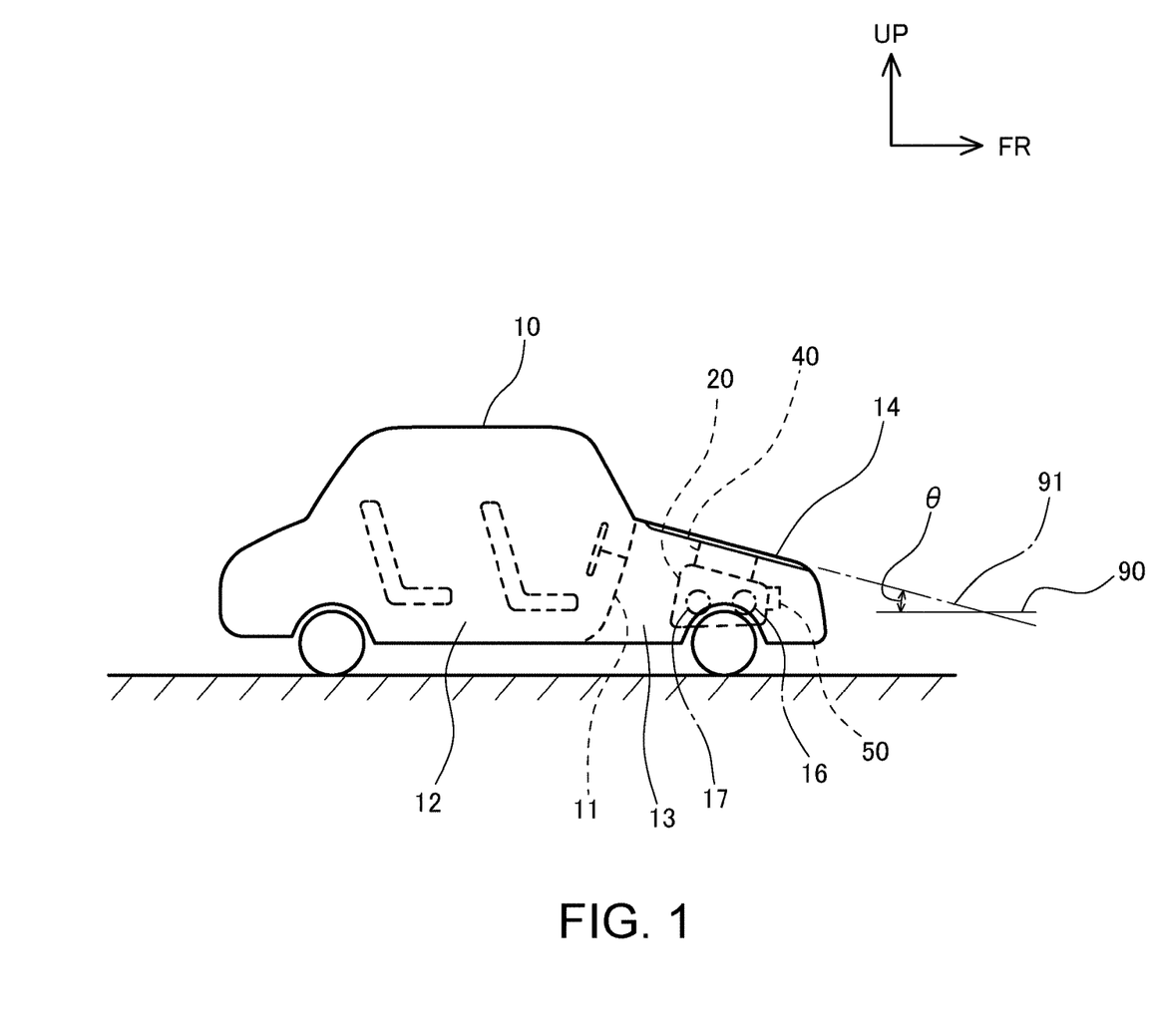
FIG. 1 is an elevation view of a vehicle mounted with a vehicle drive device of an embodiment.

As shown in FIG. 1, the vehicle drive device 20 of the embodiment is a hybrid type drive device including motors 16, 17 and an engine 15 (see FIG. 2) for driving the vehicle 10 and mounted in a front compartment 13 of the vehicle 10. The front compartment 13 is a front space of the vehicle 10 divided from a vehicle interior 12 by a dash panel 11. In consideration of collision safety, the front compartment 13 has its upper side covered with a hood 14 which is inclined at a certain angle θ (theta) as indicated by a dot-and-dash line 91 relative to a line 90 parallel to the ground surface such that the hood 14 increases its height from the front toward the rear of the vehicle.

A vehicle control device 40 for controlling the motors 16, 17 of the vehicle drive device 20 is mounted on the top of the vehicle drive device 20. The vehicle control device 40 is mounted to incline such that its upper surface is inclined to get higher from the vehicle front toward the vehicle rear along the inclination of the front compartment 13. In addition, a front portion of the vehicle drive device 20 is mounted with an oil cooler 50 for cooling a cooling oil for cooling the motors 16, 17.

Figure 2:
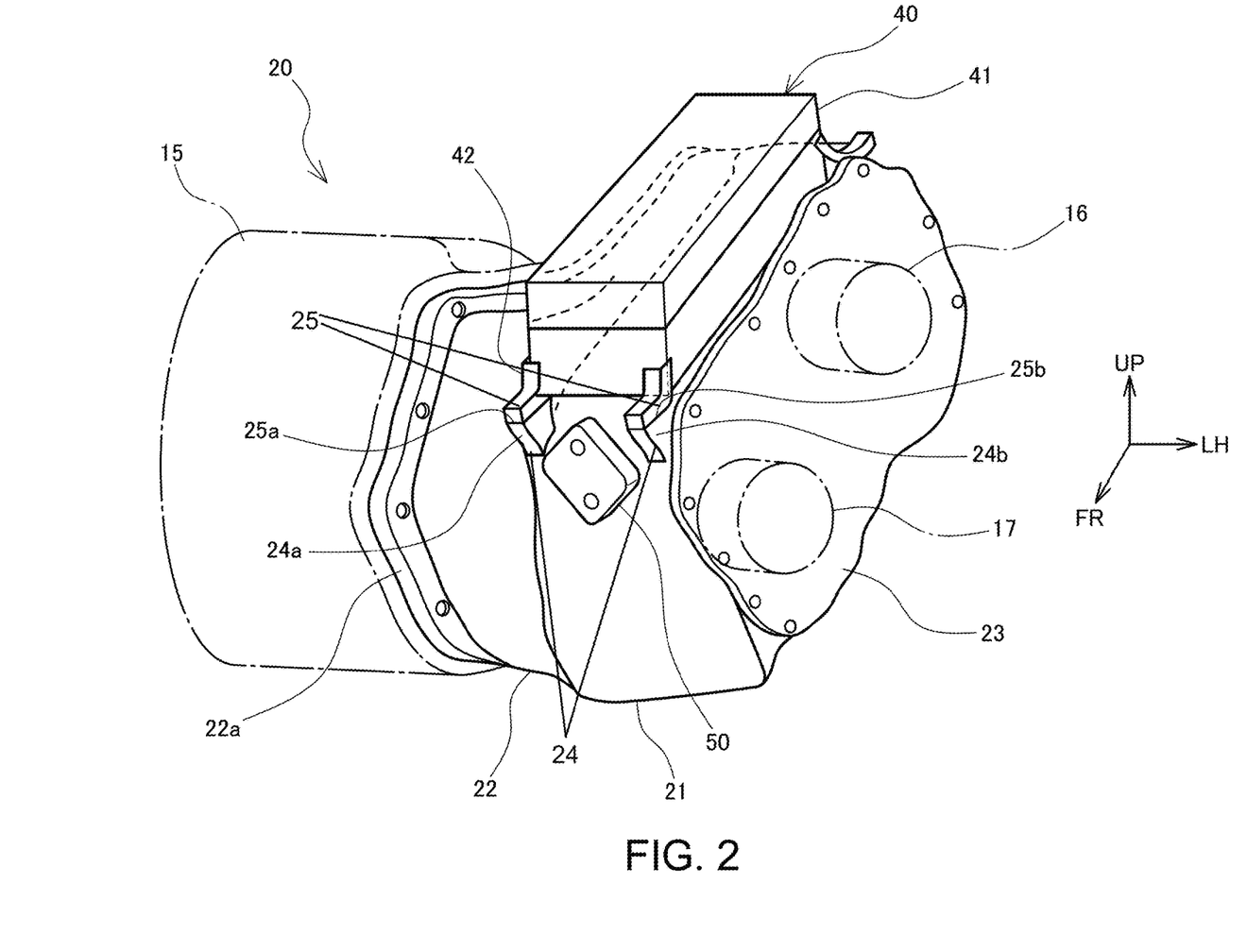
FIG. 2 is a perspective view of a vehicle drive device of an embodiment.
Figure 3:
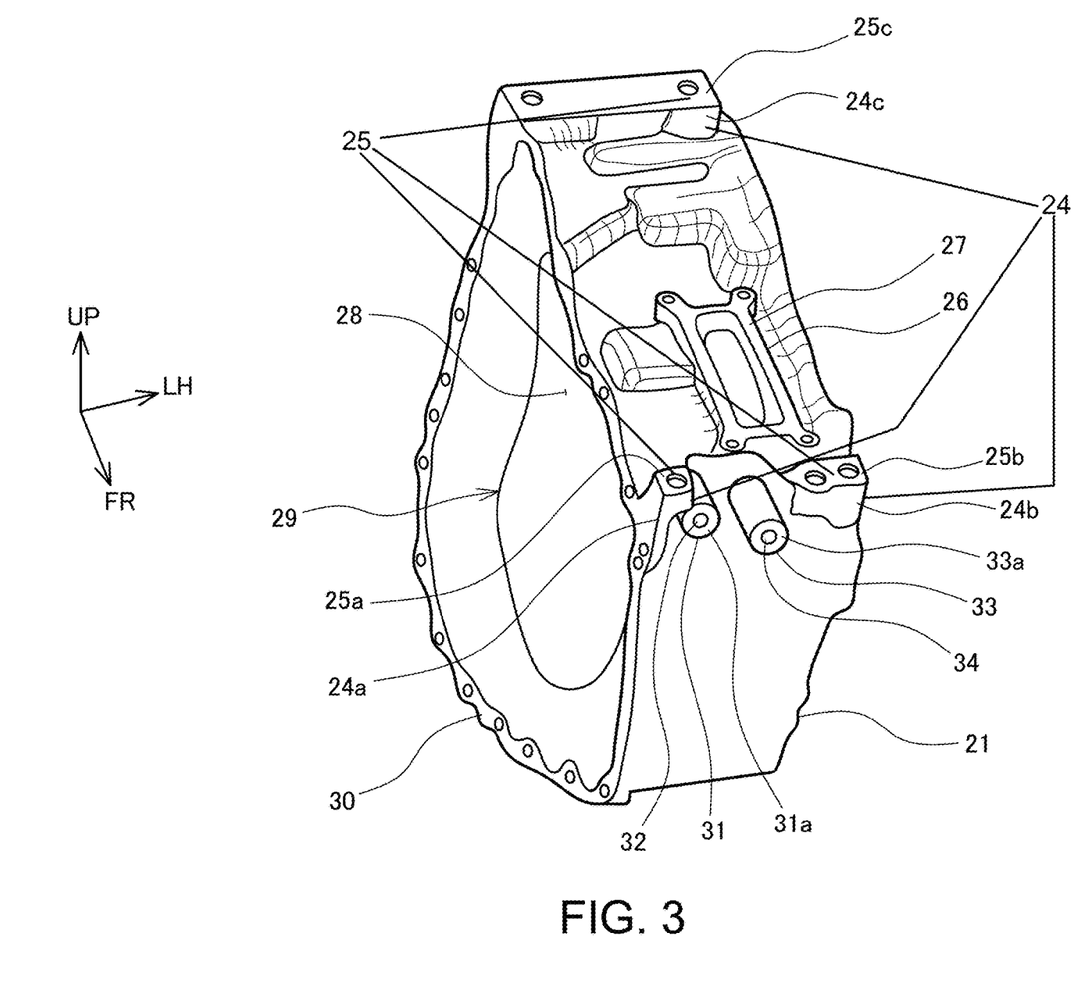
FIG. 3 is a perspective view of a motor casing used for a vehicle drive device of an embodiment.
Figure 4:
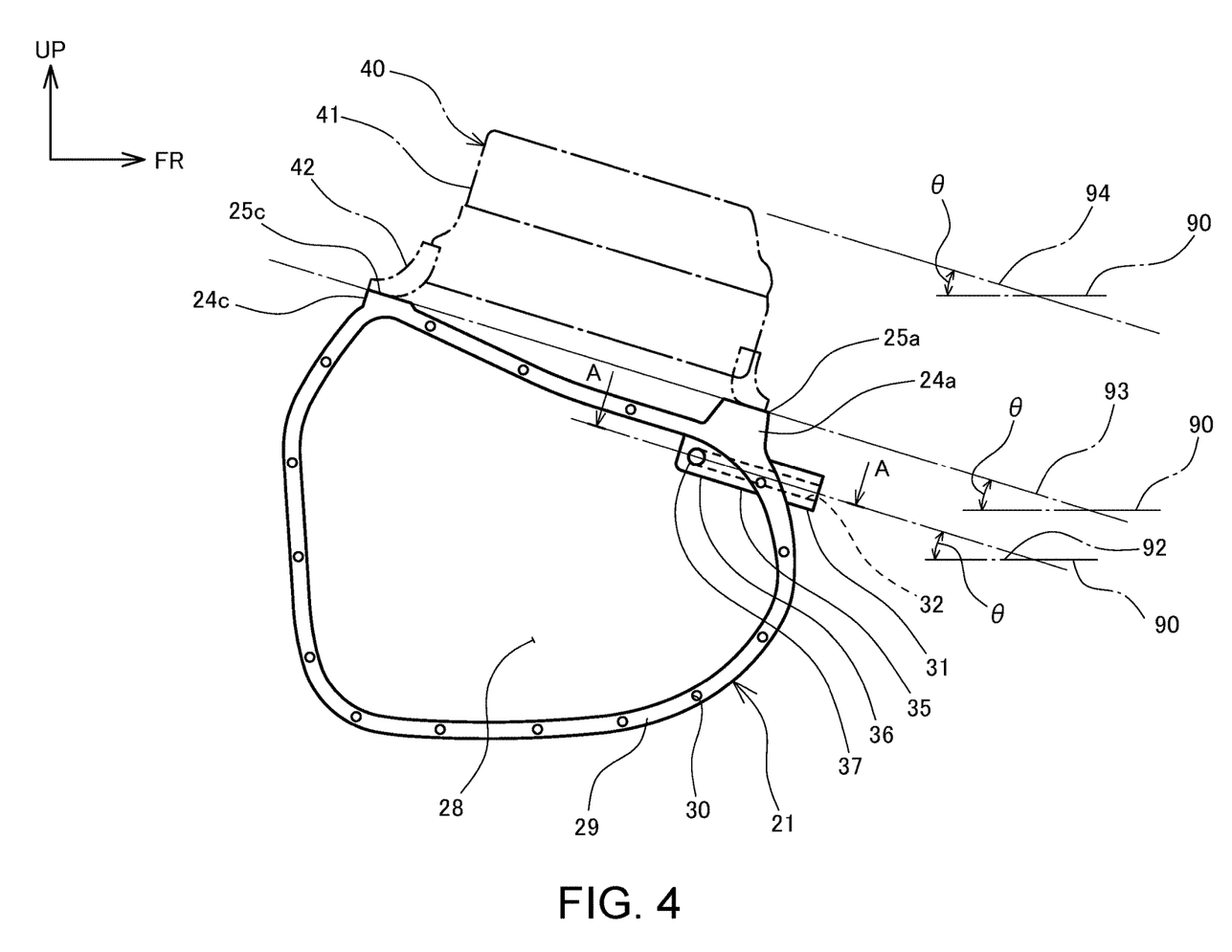
FIG. 4 is a side view of the motor casing shown in FIG. 3.

As shown in FIG. 2, the vehicle drive device 20 comprises the motors 16, 17, the motor casing 21 for housing the motors 16, 17, a right cover 22, a left cover 23, and the engine 15. As shown in FIGS. 3 and 4, the motor casing 21 is an annular member having an approximately trapezoidal cross section which has round corners and a rear portion higher than a front portion and includes therein a partition wall 28 for dividing the interior into right and left portions. The motors 16, 17 for driving the vehicle are housed in a concave portion (not shown) on the left side of the partition wall 28 in the vehicle breadthwise direction shown in FIG. 3, and gears (not shown) provided between the motors 16, 17 and the engine 15 are housed in a concave portion 29 on the right side of the partition wall 28 in the vehicle breadthwise direction. As shown in FIG. 2, the right cover 22 for covering the gears is fastened with bolts to a right flange 30 of the motor casing 21 shown in FIG. 3. The right cover 22 has a flange 22a at the right end, and the engine 15 is mounted to the outside of the right end flange 22a. As shown in FIG. 2, the left cover 23 for covering the motors 16, 17 housed in the left side concave portion is attached to the left side of the motor casing 21.

As shown in FIG. 2 and FIG. 3, an equipment mounting seat 24, where the vehicle control device 40 is mounted, is provided on the top of the motor casing 21. FIG. 3 shows that the equipment mounting seat 24 comprises a front right seat 24a and a front left seat 24b which are protruded to an obliquely upward direction at the front right and left portions of the motor casing 21, and a rear seat 24c which is protruded to an obliquely upward direction at the rear portion of the motor casing 21. An upper side surface of the front right seat 24a forms a front right seat surface 25a to which mounting legs 42 for mounting a housing 41 for the vehicle control device 40 are attached. Similarly, the upper side surfaces of the front left seat 24*b* and the rear seat 24*c* form a front left seat surface 25*b* and a rear seat surface 25*c* to which the mounting legs 42 for the housing 41 for the vehicle control device 40 are attached. In the following description, the front right seat 24*a*, the front left seat 24*b*, and the rear seat 24*c* are collectively referred to as the equipment mounting seat 24 when they are not distinguished from one another. Similarly, when the front right seat surface 25*a*, the front left seat surface 25*b*, and the rear seat surface 25*c* are not distinguished from one another, they are collectively referred to as a seat surface 25.

As shown in FIG. 4, when the vehicle drive device 20 is mounted on the vehicle 10, the front right seat surface 25*a*, the front left seat surface 25*b*, and the rear seat surface 25*c* configuring the seat surface 25 are surfaces which are inclined to get higher from the front toward the rear of the vehicle at a prescribed angle θ (theta) as indicated by a dot-and-dash line 93 relative to a line 90 parallel to the ground. Therefore, when the mounting legs 42 for the vehicle control device 40 are fixed to the seat surface 25, the upper surface of the vehicle control device 40 is inclined to get higher from the vehicle front toward the vehicle rear at the prescribed angle θ (theta) as indicated by a dot-and-dash line 94. Accordingly, when the vehicle drive device 20 is mounted on the vehicle 10, the vehicle control device 40 is inclined to get its upper surface higher from the vehicle front toward the vehicle rear along the inclination of the front compartment 13.

As shown in FIG. 3, the top part of the motor casing 21 is provided with a terminal pedestal 26 for attaching the terminal block for the motors 16, 17. The upper side surface of the terminal pedestal 26 forms a terminal pedestal surface 27 to which the terminal block is attached. Similar to the above-described seat surface 25, the terminal pedestal surface 27 is an inclined surface to get higher from the vehicle front toward the vehicle rear at a prescribed angle θ (theta) relative to the line 90 parallel to the ground when the vehicle drive device 20 is mounted on the vehicle 10. Therefore, when the terminal block is attached to the terminal pedestal surface 27, similar to the vehicle control device 40, the terminal block is inclined so to get higher from the vehicle front toward the vehicle rear along the inclination of the front compartment 13 when the vehicle drive device 20 is mounted on the vehicle 10. The terminal block for the motors 16, 17 and the vehicle control device 40 are connected by a cable not shown in the figure.

FIG. 3 shows that oil cooler connection seats 31, 33 to which the oil cooler 50 shown in FIG. 2 is connected are provided on end surfaces 31*a*, 33*a* which are on the front of the motor casing 21. As shown in FIG. 4, the oil cooler connection seats 31, 33 are round rod-like portions protruded in an obliquely downward direction from the front of the motor casing 21, and the end surfaces 31*a*, 33*a* are formed to have longitudinal holes 32, 34. Similar to the seat surface 25 of the equipment mounting seat 24 described above, when the vehicle drive device 20 is mounted on the vehicle 10, the longitudinal hole 32 shown in FIG. 4 is extended in an inclined direction so to get higher from the vehicle front toward the vehicle rear at a prescribed angle θ (theta) as indicated by a dot-and-dash line 92 relative to the line 90 parallel to the ground. Therefore, the longitudinal hole 32 is extended in an inclined direction so to get higher from the vehicle front toward the vehicle rear in parallel with the seat surface 25 of the equipment mounting seat 24. Here, the longitudinal hole 32 is a cast hole formed by casting when the motor casing 21 is casted as described later.

Figure 5:
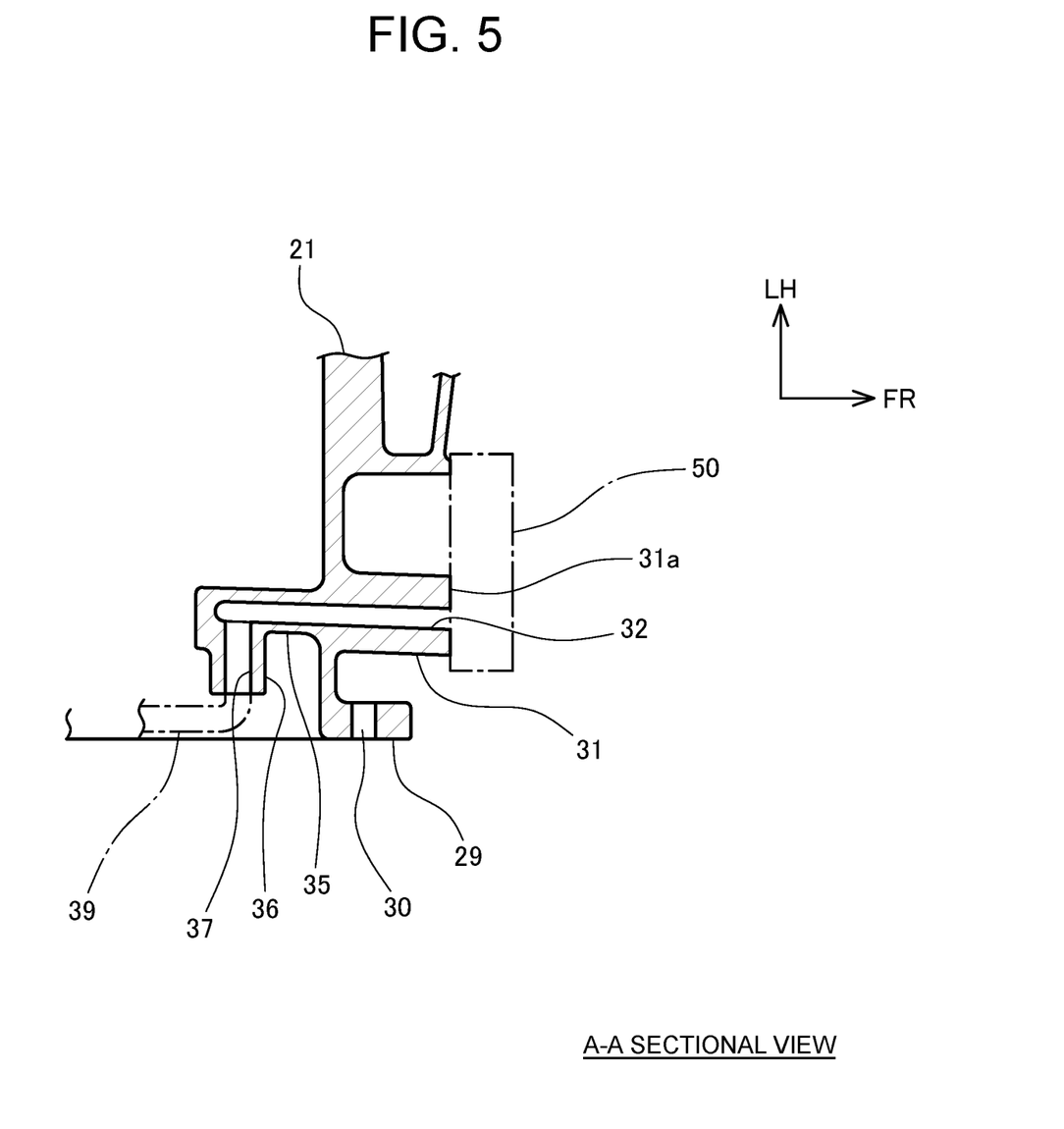
FIG. 5 is an A-A sectional view of the motor casing shown in FIG. 4.

As shown in FIG. 4 and FIG. 5, the motor casing 21 of the oil cooler connection seat 31 is provided therein with a round rod like projection portion 35 extended in the forward and backward directions, and a round rod-like cooling pipe connection seat 36 extended in a direction orthogonal to the projection portion 35. The longitudinal hole 32 provided in the oil cooler connection seat 31 is extended in the forward and backward directions in communication with the interior of the projection portion 35.

The cooling pipe connection seat 36 is provided with a transverse hole 37, which is shallower than the longitudinal hole 32, and extended in a direction orthogonal to the longitudinal hole 32 so to communicate therewith. The transverse hole 37 is a machined hole formed by machining with a drill or the like after the motor casing 21 is casted as described later. A cooling pipe 39 through which the cooling oil flows is connected to the transverse hole 37. The longitudinal hole 32 and the transverse hole 37 configure a part of the oil passage for flowing the cooling oil between the oil cooler 50 and the motors 16, 17.

As shown in FIG. 5, the oil cooler 50 is directly attached to the end surfaces 31*a*, 33*a* of the oil cooler connection seats 31, 33.

Figure 6:
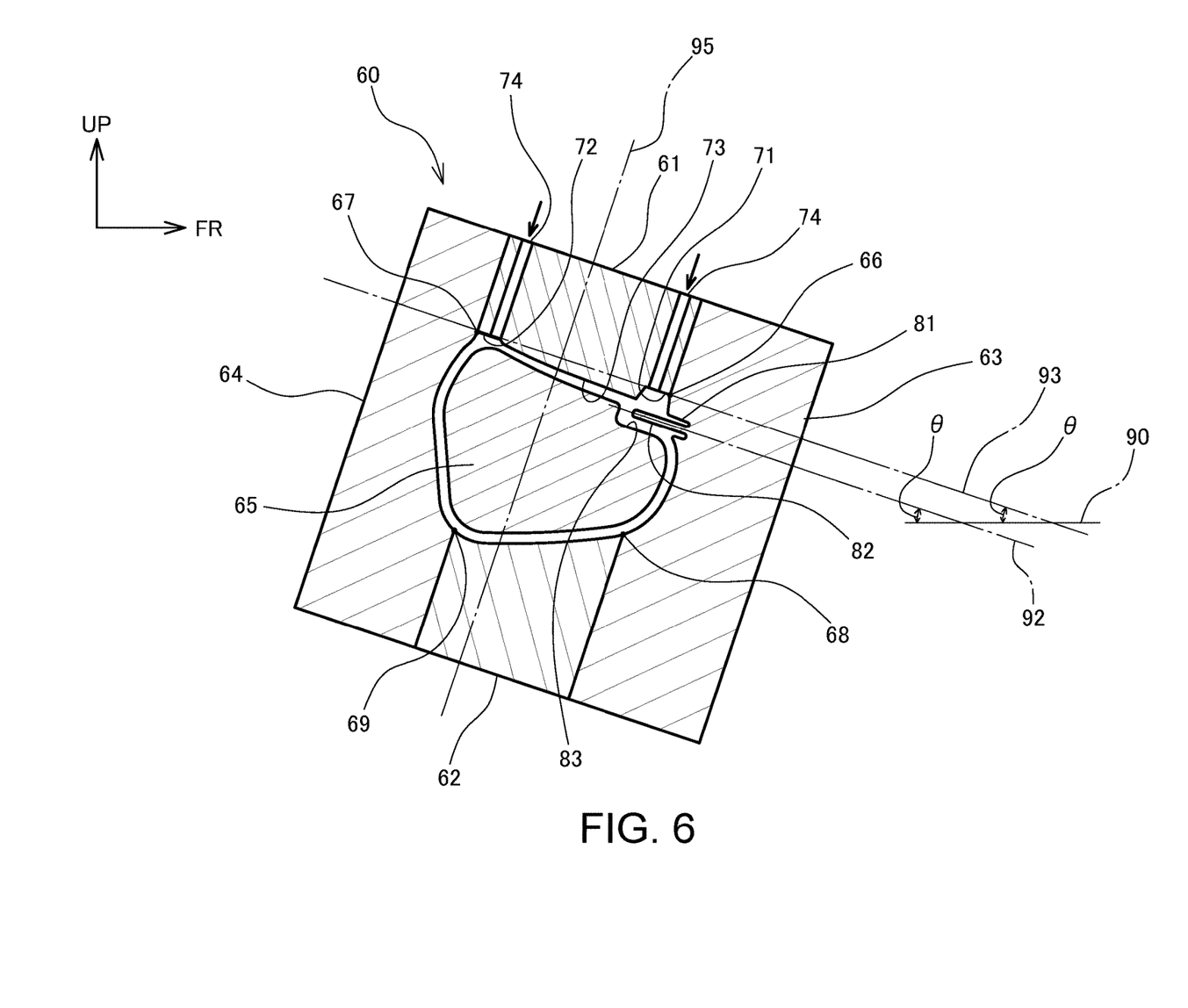
FIG. 6 is a sectional view of a portion where a longitudinal hole is formed in a mold for casting the motor casing shown in FIG. 4.
Figure 7:
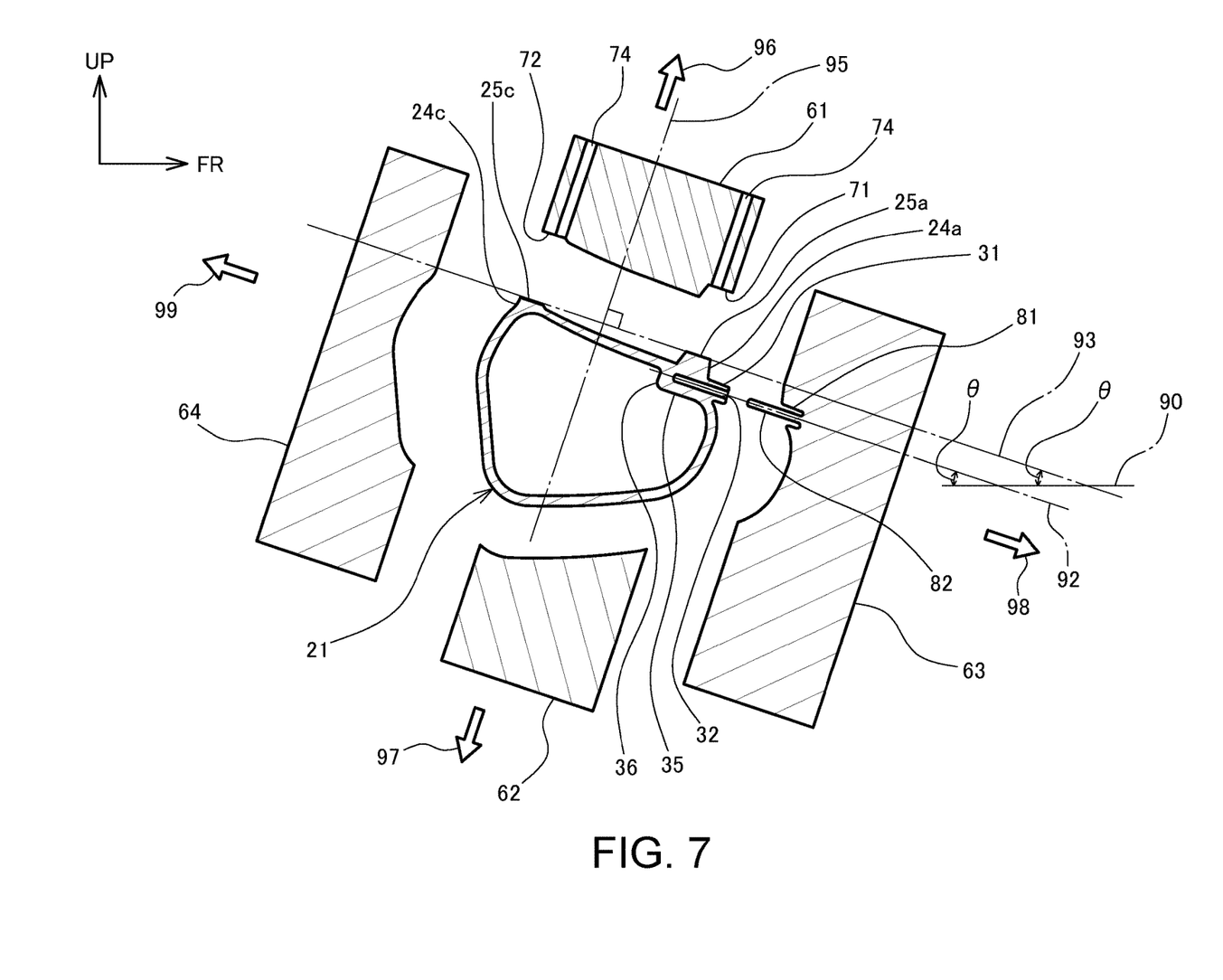
FIG. 7 is a sectional view showing demolding after casting of the motor casing by the mold shown in FIG. 6.

A manufacturing method of the motor casing 21 will be described with reference to FIGS. 6 and 7. The motor casing 21 shown in FIG. 6 is a cast metal formed by charging molten metal in a mold 60 which is made by assembling six molds including an upper mold 61, a lower mold 62, a front mold 63, a rear mold 64, a right mold 65, and an unshown left mold. First, a structure of the mold 60 is described.

The upper mold 61 is a mold for casting the top of the motor casing 21 including the equipment mounting seat 24. The upper mold 61 comprises a front seat-forming portion 71 which forms the front right seat 24*a* and the front left seat 24*b* of the equipment mounting seat 24, a rear seat-forming portion 72 which forms the rear seat 24*c*, and a top part-forming portion 73 which forms the top between them. Similar to the seat surface 25, the lower surface of the front seat-forming portion 71 and the lower surface of the rear seat-forming portion 72 which form the seat surface 25 are extended in a direction such that they are inclined so to get higher from the vehicle front toward the vehicle rear at the prescribed angle θ (theta) as indicated by the dot-and-dash line 93 relative to the line 90 parallel to the ground when the vehicle drive device 20 is mounted on the vehicle 10. A sprue 74 through which molten metal is charged under pressure is provided in the front seat-forming portion 71 and the rear seat-forming portion 72 of the upper mold 61.

The front mold 63 is provided therein with a cylindrical concave portion 81 for forming the oil cooler connection seat 31. A columnar core pin 82 for forming the longitudinal hole 32 is provided at the center of the concave portion 81. Similar to the longitudinal hole 32, the concave portion 81 and the core pin 82 are extended in an inclined direction such that they get higher from the vehicle front toward the vehicle rear at the prescribed angle θ (theta) as indicated by the dot-and-dash line 92 relative to the line 90 parallel to the ground when the vehicle drive device 20 is mounted on the vehicle 10.

The lower mold 62 is a mold for forming the lower portion opposed to the top of the motor casing 21, and the rear mold 64 is a mold for forming the rear portion opposed to the front of the motor casing 21.

The right mold 65 is a mold which is fitted in a hollow portion formed when the upper mold 61, the lower mold 62, the front mold 63, and the rear mold 64 are combined, and forms the right-side concave portion 29 of the motor casing 21 shown in FIG. 2. The right mold 65 is provided with the projection portion 35 which is within the motor casing 21, and a concave portion 83 which forms the cooling pipe connection seat 36. When the right mold 65 and the front mold 63 are mutually assembled, the core pin 82 of the front mold 63 is advanced into the concave portion 83 of the right mold 65. The unshown left mold has a structure similar to that of the right mold 65.

A parting line 66 between the upper mold 61 and the front mold 63 is positioned on a front end corner of the front seat-forming portion 71. A parting line 67 between the upper mold 61 and the rear mold 64 is positioned on a rear end corner of the rear seat-forming portion 72. The demolding direction of the upper mold 61 becomes a vertical direction relative to the dot-and-dash line 93; namely, a direction of a dot-and-dash line 95 perpendicular to the lower surface of the front seat-forming portion 71 and the lower surface of the rear seat-forming portion 72 which form the seat surface 25. The demolding directions of the front mold 63 and the rear mold 64 are parallel to the lower surface of the front seat-forming portion 71 forming the seat surface 25 and the lower surface of the rear seat-forming portion 72 and become directions along which the dot-and-dash lines 92, 93 are extended. Moreover, a parting line 69 between the lower mold 62 and the rear mold 64 is close to a ridgeline between the lower and rear portions of the motor casing 21, and a parting line 68 between the lower mold 62 and the front mold 63 is located at the lower position opposed to the upper side parting line 66. The demolding direction of the lower mold 62 is similar to that of the upper mold 61 and it is the direction of the dot-and-dash line 95 perpendicular to the dot-and-dash line 93. The demolding direction of the rear mold 64 is similar to that of the front mold 63 and it is the direction parallel to the dot-and-dash lines 92, 93. The demolding directions of the right mold 65 and the unshown left mold are extended in the right and left direction in the same plane as that of the line 90 parallel to the ground when the vehicle drive device 20 is mounted on the vehicle 10.

Next, a method for manufacturing the motor casing 21 is described below. First, a mold assembling step is performed to assemble the mold 60 by combining the upper mold 61, the lower mold 62, the front mold 63, the rear mold 64, the right mold 65, and the unshown left mold described with reference to FIG. 6. Then, a charging step is performed to charge the molten metal into the mold 60 through the sprues 74 of the upper mold 61. When the molten metal temperature lowers and the metal solidifies, a demolding step is performed to demold the upper mold 61, the lower mold 62, the front mold 63, the rear mold 64, the right mold 65, and the left mold as shown in FIG. 7. The upper mold 61 is demolded in a front and obliquely upward direction as indicated by an arrow 96 along the dot-and-dash line 95 which is perpendicular to the dot-and-dash line 93. The front mold 63 is demolded in an obliquely downward and forward direction as indicated by an arrow 98 parallel to the dot-and-dash lines 92, 93. At this time, since the demolding direction of the front mold 63 is the same as the directions in which the oil cooler connection seat 31 and the longitudinal hole 32 are extended, the front mold 63 can be demolded, and the longitudinal hole 32 can be formed by casting.

The lower mold 62 and the rear mold 64 are respectively demolded toward an obliquely downward and backward direction and an obliquely upward and backward direction as indicated by arrows 97, 99. The right mold 65 and the left mold are respectively demolded in the right and left directions. When the right mold 65 is demolded, the projection portion 35 and the cooling pipe connection seat 36 are formed within the motor casing 21.

After the demolding step is completed, the casted motor casing 21 is taken out, and the hole machining step is performed to form the transverse hole 37 in the cooling pipe connection seat 36 by machining with a drill or the like as shown in FIG. 5. When the transverse hole 37 is communicated with the longitudinal hole 32, an oil passage is formed to bring the oil cooler 50 into communication with the inside of the motor casing 21.

As described above, the motor casing 21 of the embodiment has the extending directions of the oil cooler connection seat 31 and the longitudinal hole 32 inclined in parallel to the seat surface 25 of the equipment mounting seat 24 so to coincide with the demolding direction of the front mold 63. Therefore, it becomes possible to cast the equipment mounting seat 24 having the inclined top seat surface 25, the front oil cooler connection seat 31, and the longitudinal hole 32.

To configure an L-shaped oil passage, the longitudinal hole 32 is formed by casting and the transverse hole 37 is formed by machining, so that the oil passage can be formed by little machining, and flexibility of the oil passage shape can be improved.

When the vehicle drive device 20 is mounted on the vehicle 10, the motor casing 21 of the embodiment is inclined such that the seat surface 25 of the equipment mounting seat 24 becomes higher from the front side to the rear side of the vehicle at a certain angle θ (theta) indicated by the dot-and-dash line 93 relative to the line 90 parallel to the ground surface. Thus, when the vehicle drive device 20 is mounted within the front compartment 13 of the vehicle 10, the upper surface of the vehicle control device 40 attached to the top of the motor casing 21 is inclined so to get higher from the vehicle front toward the vehicle rear along the inclination of the front compartment 13. Therefore, the vehicle drive device 20 can be mounted in the front compartment 13 with high space efficiency.

In addition, the sprues 74 are formed in the upper mold 61, and molten metal is charged from the side of the equipment mounting seat 24 having the inclined seat surface 25, so that casting quality of the equipment mounting seat 24 can be secured.

The vehicle drive device 20 described above is a hybrid type drive device including the motors 16, 17 and the engine 15 for driving the vehicle 10. However, it may be an electric drive device for electric vehicle including a vehicle driving motor but not including the engine 15.

In the above-described vehicle drive device 20, the oil cooler 50 is mounted to the front portion of the motor casing 21, and the oil cooler connection seat 31 is provided on the front portion of the motor casing 21. Alternatively, it may be configured such that the oil cooler 50 is attached to the rear of the motor casing 21, and the oil cooler connection seat 31 is provided on the rear of the motor casing 21.

In this case, the oil cooler connection seat 31 and the longitudinal hole 32 as a cast hole are casted by the rear mold 64 for casting the rear portion, and similar to the front mold 63, the rear mold 64 is demolded in a direction parallel to the seat surface 25 of the equipment mounting seat 24.

In the above described vehicle 10, the vehicle drive device 20 is mounted within the front compartment 13 which is inclined to get higher from the vehicle front toward the vehicle rear. However, the vehicle drive device 20 may also be mounted in a rear compartment which is inclined so to get higher from the vehicle rear toward the vehicle front. In such a case, it may be configured such that the motor casing 21 is inclined so that the seat surface 25 of the equipment mounting seat 24 becomes higher from the vehicle rear toward the vehicle front along the inclination of the rear compartment, and the longitudinal hole 32 as a cast hole is inclined to become higher from the vehicle rear toward the vehicle front in parallel to the seat surface 25. In addition, the vehicle control device 40 can be attached to the top of the motor casing 21 so that its upper surface is inclined to get higher from the vehicle rear toward the vehicle front along the inclination of the rear compartment.

In the above description, the upper mold 61 is provided with the sprues 74 and the molten metal is charged from the side of the equipment mounting seat 24 having the inclined seat surface 25, but when the sprues 74 are extended in a direction orthogonal with the casting direction, the sprues 74 can be provided not in the upper mold 61 but in the lower mold 62, for example.

The invention claimed is:

1. A motor casing of cast metal which is used for a vehicle drive device mounted on a vehicle, comprising:
    an equipment mounting seat provided on the top of the motor casing,
    an oil cooler connection seat, and
    a cast hole opened in the oil cooler connection seat, wherein:
    the equipment mounting seat has an inclined seat surface so to get higher from one side toward the other, and
    the cast hole is inclined from the one side toward the other in parallel to the seat surface of the equipment mounting seat.

2. The motor casing according to claim 1, wherein a machined hole is extended from an interior in a direction to intersect with the cast hole so to communicate with the cast hole and has a depth shallower than that of the cast hole.

3. The motor casing according to claim 2, wherein:
    the oil cooler connection seat is provided on a front of the motor casing,
    the one side is a vehicle front and the other side is a vehicle rear,
    the vehicle drive device is mounted in a front compartment which is covered with a hood inclined so to get higher from the vehicle front toward the vehicle rear, and
    when the vehicle drive device is mounted in the front compartment, the seat surface of the equipment mounting seat is inclined to get higher from the vehicle front toward the vehicle rear along the inclination of the hood.

4. A vehicle drive device mounted in a front compartment which is covered with a hood inclined to get higher from a vehicle front toward a vehicle rear, comprising:
    a motor casing including:
        an equipment mounting seat provided on a top part,
        an oil cooler connection seat provided on a front part,
        a cast hole opened in the oil cooler connection seat, and
        a machined hole which is in communication with the cast hole from an interior and shallower than a depth of the cast hole;
    a vehicle control device attached to the top of a seat surface of the equipment mounting seat;
    an oil cooler attached to the oil cooler connection seat; and
    a cooling pipe connected to the machined hole, wherein:
    the seat surface of the equipment mounting seat of the motor casing is inclined to get higher from the front toward the rear, and the cast hole is inclined to get higher from the front toward the rear in parallel to the seat surface of the equipment mounting seat, and
    when the vehicle drive device is mounted in the front compartment, an upper surface of the vehicle control device is inclined to get higher from the vehicle front toward the vehicle rear along the inclination of the hood.

* * * * *